(12) United States Patent
Wheeland et al.

(10) Patent No.: US 10,518,617 B2
(45) Date of Patent: Dec. 31, 2019

(54) RETRACTABLE HEADLINER FOR VEHICLE CONVERTIBLE SYSTEM

(71) Applicant: Honda Motor Co., Ltd., Tokyo (JP)

(72) Inventors: Jeffrey D. Wheeland, Radnor, OH (US); Jason S. Borland, Marysville, OH (US); Michael T. Binfet, Bellefontaine, OH (US); Thrinath Chowdary Namala, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 103 days.

(21) Appl. No.: 15/907,742

(22) Filed: Feb. 28, 2018

(65) Prior Publication Data

US 2019/0263234 A1    Aug. 29, 2019

(51) Int. Cl.
*B60J 7/00* (2006.01)
*B60J 7/02* (2006.01)

(52) U.S. Cl.
CPC ............ *B60J 7/0007* (2013.01); *B60J 7/026* (2013.01)

(58) Field of Classification Search
CPC .............. B60R 21/232; B60R 13/0225; B60R 2021/23386; B60R 21/213; B60R 21/2338; B60R 13/0206; B60R 2013/0287
See application file for complete search history.

(56) References Cited

U.S. PATENT DOCUMENTS

| | | | |
|---|---|---|---|
| 5,456,516 A | 10/1995 | Alexander et al. | |
| 6,416,120 B1 * | 7/2002 | Schutt | B60J 7/22 296/217 |
| 6,497,447 B1 * | 12/2002 | Willard | B60J 7/146 296/107.08 |
| 6,695,386 B1 * | 2/2004 | Willard | B60J 7/145 296/107.01 |
| 9,090,149 B1 * | 7/2015 | Binfet | B60J 7/061 |
| 9,592,722 B2 | 3/2017 | Richter | |
| 2001/0006297 A1 * | 7/2001 | Dintner | B60J 7/146 296/107.17 |
| 2004/0032147 A1 * | 2/2004 | Eichhorst | B60J 7/1855 296/121 |

(Continued)

FOREIGN PATENT DOCUMENTS

| | | |
|---|---|---|
| DE | 102009035031 | 2/2011 |
| DE | 102011110013 | 3/2012 |
| FR | 2924382 | 12/2009 |

*Primary Examiner* — Kiran B Patel
(74) *Attorney, Agent, or Firm* — Rankin, Hill & Clark LLP (57) ABSTRACT

A vehicle convertible system include left and right side rails extending in a vehicle length direction and defining a roof opening, and a roof member covering the roof opening. The roof member includes a frame, an outer cover attached to the frame, and a headliner including a cover attached to an underside of the frame. A linkage connected to the roof member moves the roof member between a closed condition and a stowed condition. A retractor attached to the roof member is connected to lateral side portions of the headliner cover. The retractor is operable by movement of the linkage. The retractor moves the lateral side portions between a covering position which conceals the linkage in the closed condition of the roof member and a retracted position inwardly of the side rails to provide clearance for the linkage as the roof member is moved to the stowed position.

11 Claims, 8 Drawing Sheets

(56) References Cited

U.S. PATENT DOCUMENTS

| | | | |
|---|---|---|---|
| 2007/0096510 A1* | 5/2007 | MacNee, III | B60J 7/061 296/219 |
| 2008/0258509 A1* | 10/2008 | Schutt | B60J 7/028 296/220.01 |
| 2008/0277963 A1* | 11/2008 | Dietl | B60J 7/043 296/107.09 |
| 2009/0102244 A1* | 4/2009 | Kanamori | B60J 7/026 296/219 |
| 2009/0108623 A1* | 4/2009 | Haberl | B60J 7/146 296/109 |
| 2010/0038927 A1* | 2/2010 | Wegener | B60J 7/1265 296/107.08 |
| 2010/0109364 A1* | 5/2010 | Park | B60R 9/058 296/37.7 |
| 2010/0201150 A1* | 8/2010 | Kinnanen | B60J 7/205 296/107.08 |
| 2012/0013142 A1* | 1/2012 | Herz | B60J 7/1234 296/107.03 |
| 2015/0224861 A1* | 8/2015 | Kopp | B60J 7/061 296/216.05 |
| 2015/0246605 A1* | 9/2015 | Kleinhoffer | B60J 10/24 296/216.06 |
| 2017/0015181 A1* | 1/2017 | Wullrich | B60J 7/146 |
| 2017/0240032 A1* | 8/2017 | Kiyota | B60J 7/11 |
| 2018/0037097 A1* | 2/2018 | Haynes | B60J 10/90 |
| 2019/0001798 A1* | 1/2019 | Sviberg | B60J 7/146 |

* cited by examiner

RETRACTABLE HEADLINER FOR VEHICLE CONVERTIBLE SYSTEM

BACKGROUND

It is desirable to maximize the open air or open roof space above a vehicle passenger compartment, and it is common to employ a convertible system including a roof which is movable from a closed condition above the passenger compartment to a stowed (open air) condition. When a convertible roof cycles from the closed condition to the stowed condition, a main link of a linkage can swing through a portion of a headliner secured to an underside of the convertible roof. Currently, there are mechanisms which pull the fabric of the headliner out of the path of the main link as the convertible roof is moved to the stowed condition. However, these known mechanisms typically require the convertible roof to have a multi-bow construction instead of a solid frame construction.

BRIEF DESCRIPTION

According to one aspect, a convertible system for a vehicle comprises left and right side rails extending in a vehicle length direction and at least partially defining a roof opening, and a roof member covering the roof opening. The roof member includes a frame, an outer cover attached to the frame and a headliner attached to an underside of the frame. The headliner includes a headliner cover. A linkage is operably connected to the roof member. The linkage is adapted to move the roof member between a closed condition and a stowed condition. A retractor is attached to the roof member and connected to lateral side portions of the headliner cover. The retractor is operable by movement of the linkage. The retractor is adapted to move the lateral side portions of the headliner cover between a covering position which conceals the linkage in the closed condition of the roof member and a retracted position inwardly of the side rails to provide clearance for the linkage as the roof member is moved to the stowed position.

According to another aspect, a convertible system for a vehicle comprises a roof member including a headliner having a headliner cover. A linkage is operably connected to the roof member. The linkage is adapted to move the roof member between a closed condition and a stowed condition. A retractor is attached to the roof member and connected to a lateral side portion of the headliner cover. The retractor is operable by movement of the linkage. The retractor is adapted to move the lateral side portion of the headliner cover between a covering position which conceals the linkage in the closed condition of the roof member and a retracted position inwardly on the roof member to provide clearance for the linkage as the roof member is moved to the stowed position. The retractor includes a first tensioning member and a second tensioning member. The first tensioning member extends in a vehicle width direction on the roof member and is coupled to the lateral side portion of the headliner cover. The second tensioning member extends in a vehicle length direction on the roof member and is connected to the linkage and the first tensioning member. During movement of the roof member from the closed condition to the stowed condition the second tensioning member is pulled inwardly by the first tensioning member moving the lateral side portion of the headliner cover to the retracted position.

According to another aspect, a headliner retractor for a convertible roof member of a vehicle convertible system is provided. The roof member is movable between a closed condition and a stowed condition by a linkage that swings through a portion of a headliner as the roof member is moved. The headliner retractor comprises a first tensioning member and a second tensioning member. The first tensioning member extends in a vehicle width direction on the roof member and is coupled to a lateral side portion of a headliner cover covering the headliner. The second tensioning member extends in a vehicle length direction on the roof member and is connected to the linkage and the first tensioning member. During movement of the roof member from the closed condition to the stowed condition the second tensioning member is pulled inwardly by the first tensioning member moving the lateral side portion of the headliner cover to the retracted position.

DETAILED DESCRIPTION

It should, of course, be understood that the description and drawings herein are merely illustrative and that various modifications and changes can be made in the structures disclosed without departing from the present disclosure. As used herein, lateral/width directions are transverse across the vehicle, i.e., left and right directions. Likewise, longitudinal/length directions refer to forward and rearward directions of vehicle travel, and the vertical directions relate to elevation, i.e., upward and downward directions.

Figure 1:
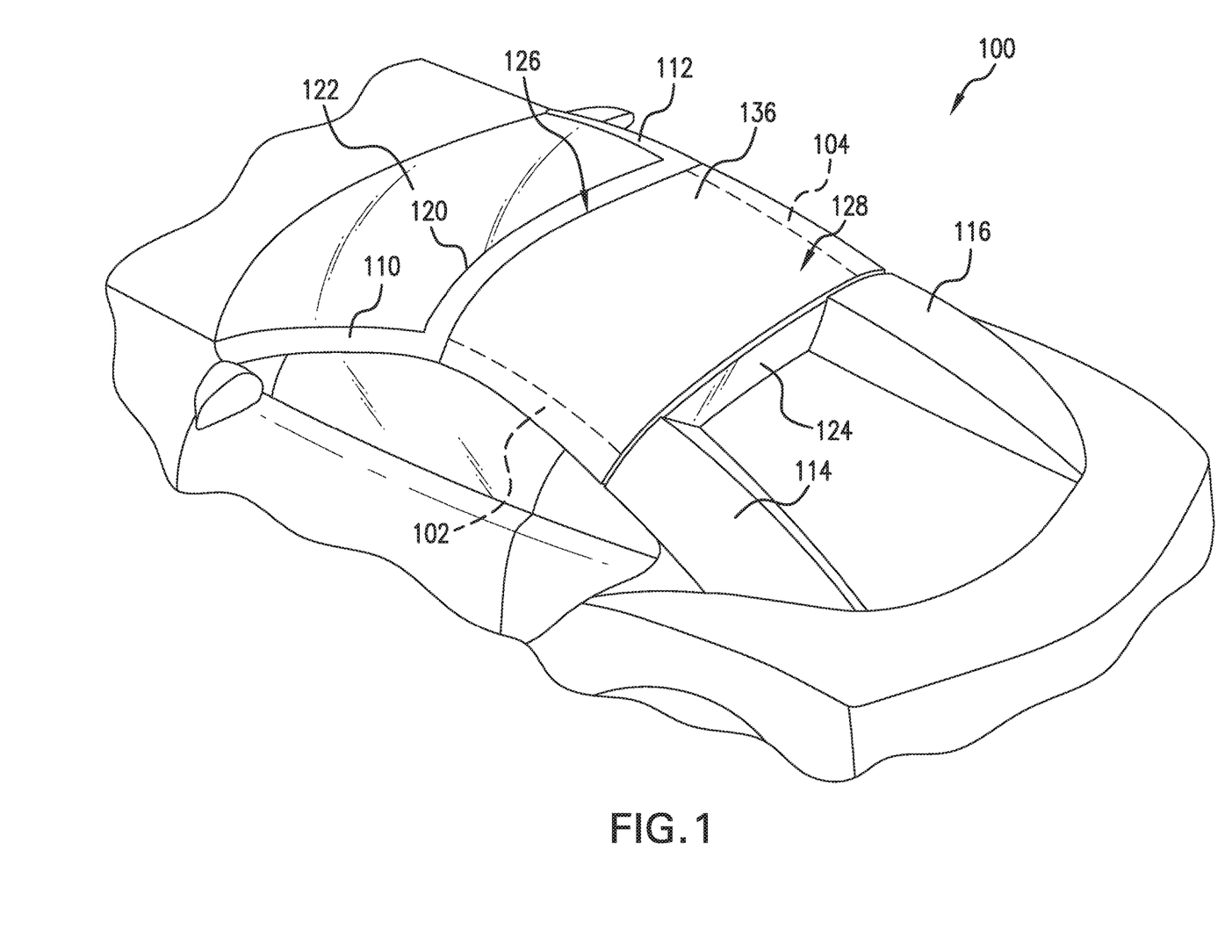
FIG. 1 is a schematic perspective view of a vehicle having an exemplary convertible system according to the present disclosure, a roof member of the convertible system in a closed position.
Figure 2:
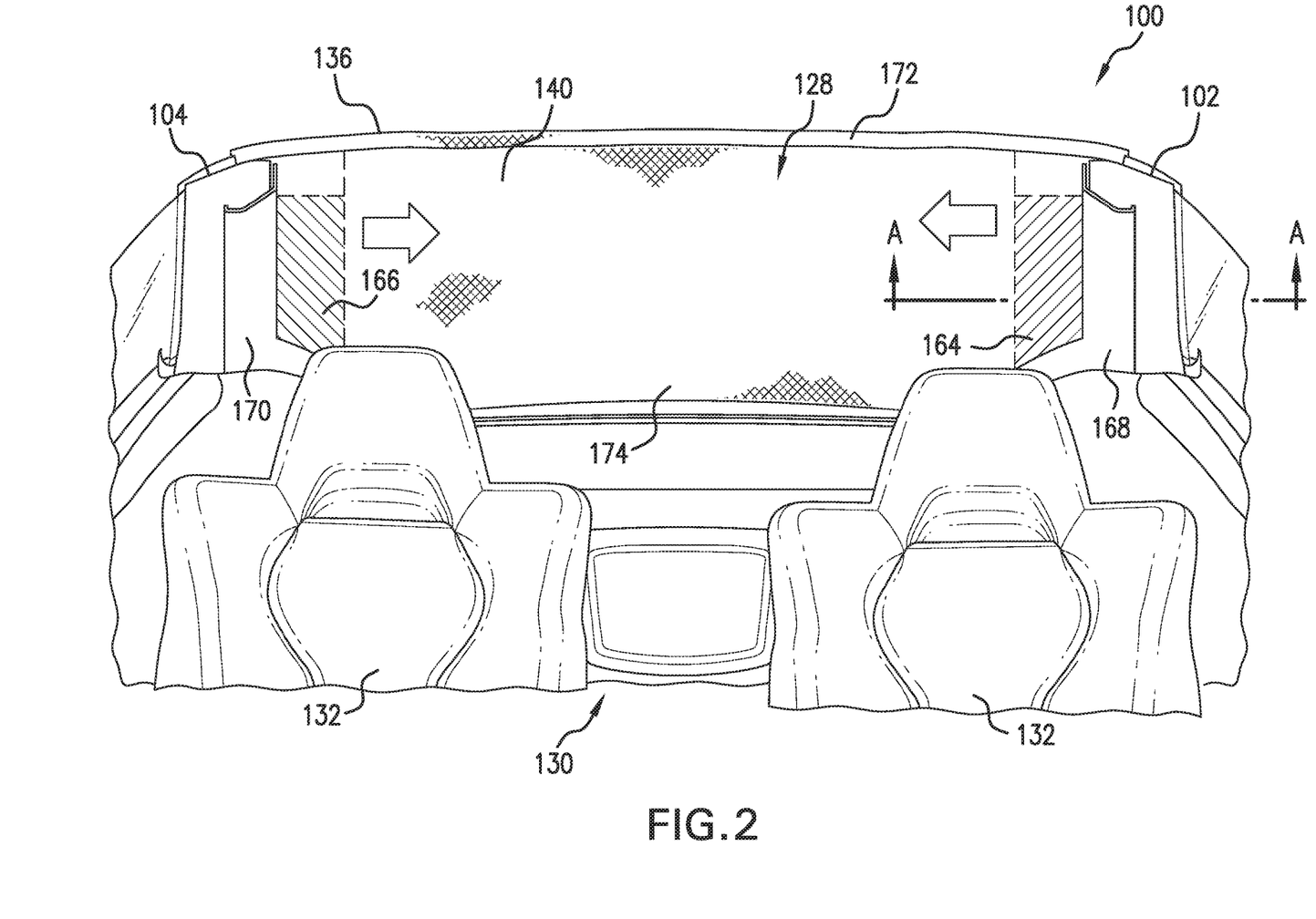
FIG. 2 is a perspective view of the vehicle with the roof member in a stowed condition.
Figure 8:
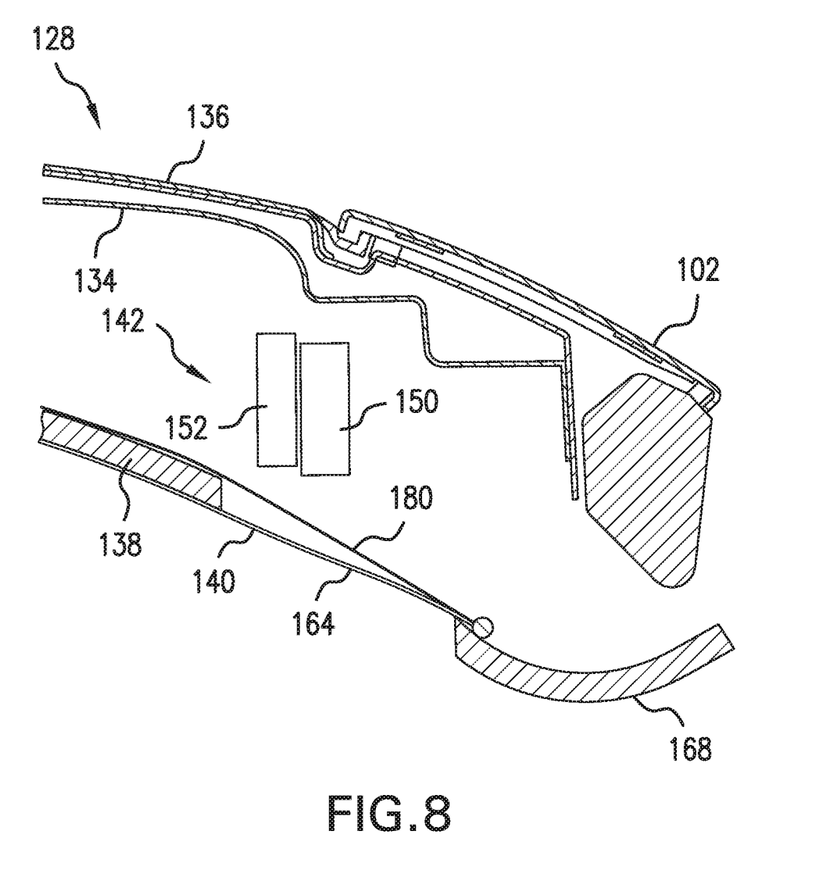
FIGS. 8-10 are cross-sectional views taken along line A-A of FIG. 2 during movement of the roof member to the stowed condition.
Figure 9:
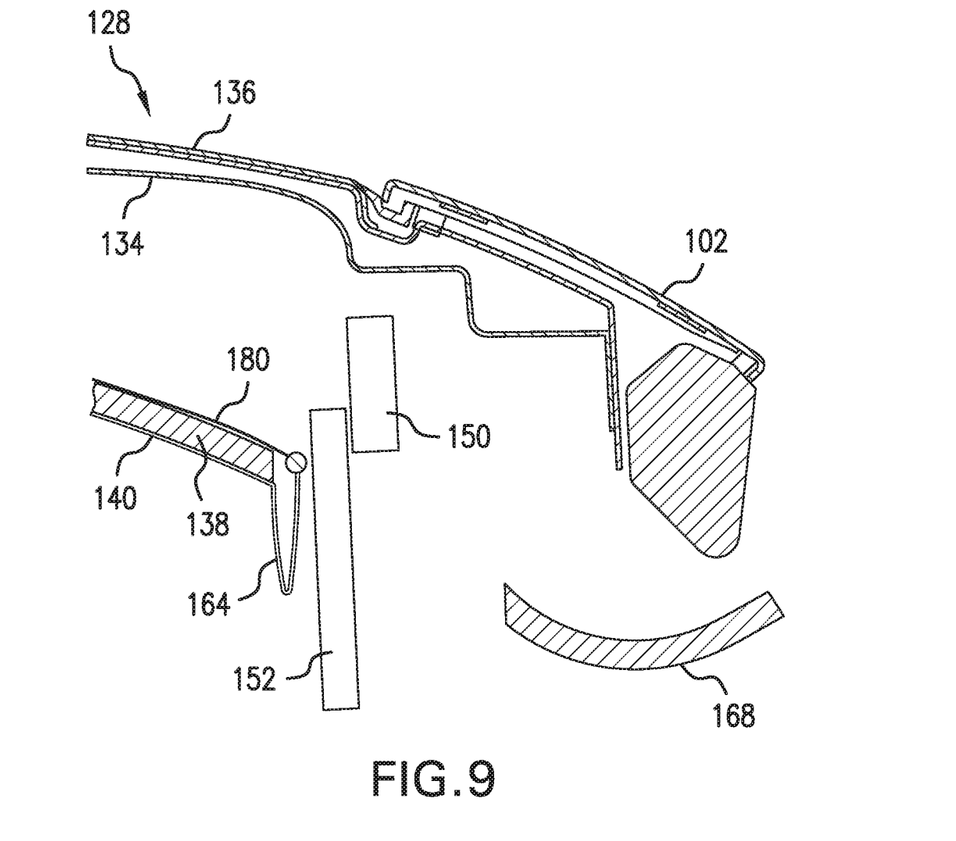
Figure 10:
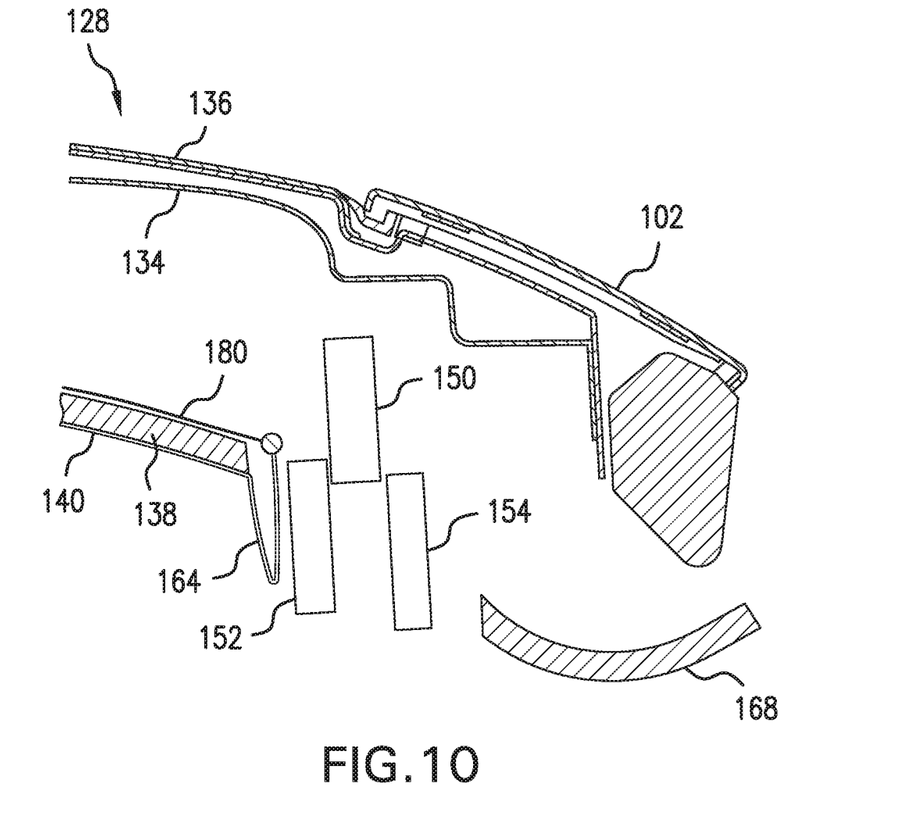
Figure 11A:
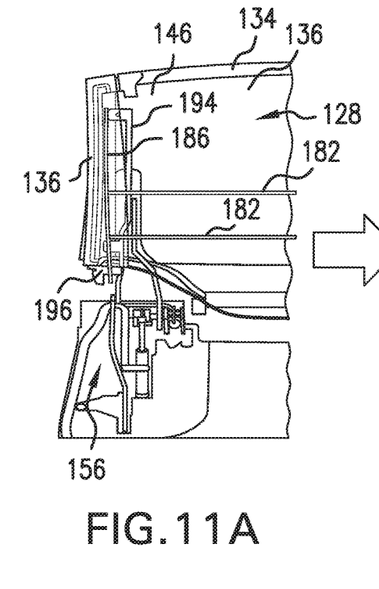
FIGS. 11(a), 12(a) and 13(a) are partial bottom views of the roof member sans the headliner and depicting operation of the headliner retractor as the roof member is moved to the stowed condition.
Figure 11B:
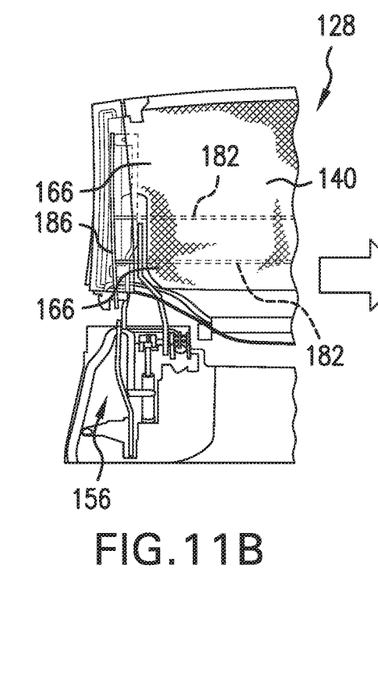
FIGS. 11(b), 12(b) and 13(b) are partial bottom views of the roof member with the headliner and depicting operation of the headliner retractor as the roof member is moved to the stowed condition.
Figure 12A:
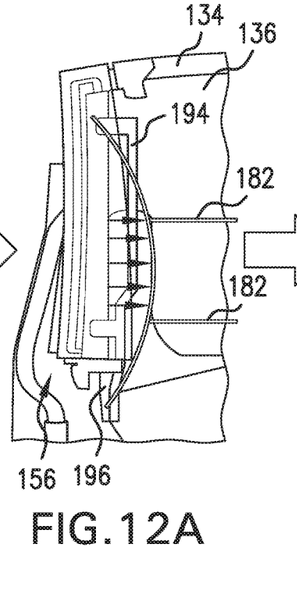
Figure 12B:
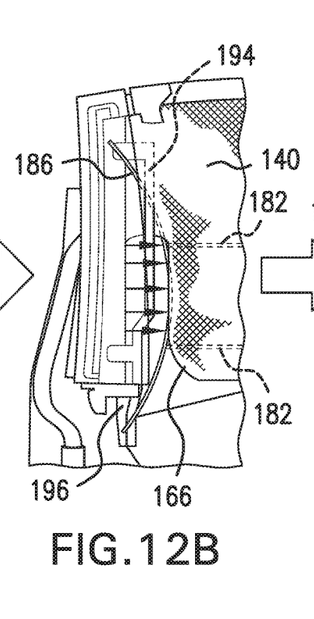

Referring now to the drawings, wherein like numerals refer to like parts throughout the several views, FIGS. 1 and 2 schematically illustrate a vehicle 100 comprising the exemplary convertible system of the present disclosure. The vehicle 100 generally includes a pair of laterally spaced side rails 102, 104 extending in a vehicle length direction. The side rails 102, 104 are connected at forward ends to forward structural pillars (i.e., A-pillars 110, 112) of a vehicle body and at rearward ends to rear structural pillars (i.e., C-pillars 114, 116) of the vehicle body. A front structural header 120 of the vehicle body spans between the forward ends of the respective side rails 102, 104 and is located above a front windshield 122. A rear windshield 124 is located between respective rear end portions of the side rails 102, 104. The side rails together with the front structural header at least partially define a roof opening 126. The vehicle 100 further includes a retractable roof member 128 covering the roof opening. The roof member 128 is movable between a closed condition (FIG. 1) above a passenger compartment 130, which typically includes vehicle seats 132, to a stowed (open air) condition (FIG. 2) rearward of the passenger compartment. As shown in FIGS. 8-10, the roof member 128 includes a frame 134, an outer cover 136 attached to the frame and a headliner 138 attached to an underside of the frame. The headliner 138 is provided with a cover 140. The cover 140 can be formed of a fabric material; although alternative like materials are contemplated.

Figure 3:
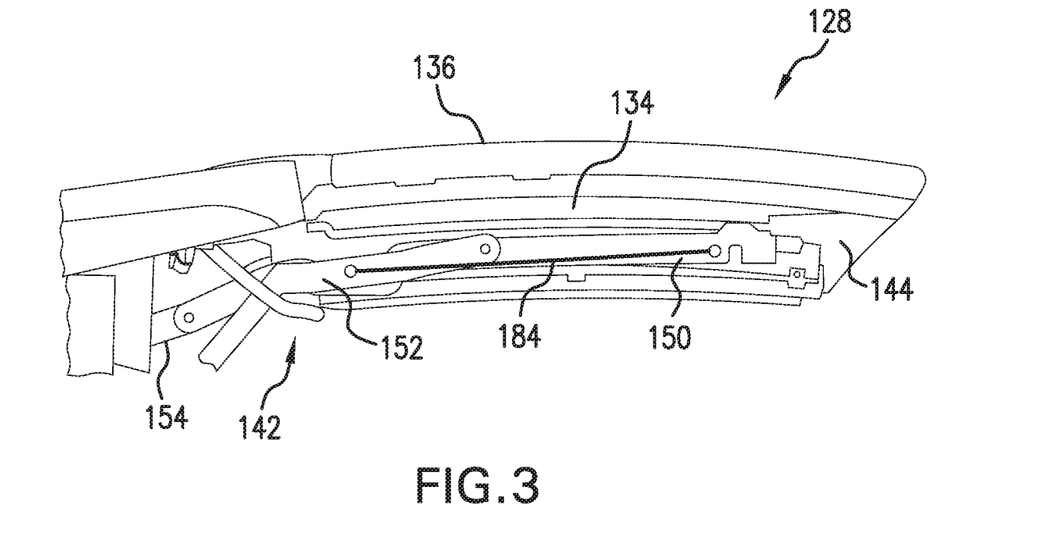
FIG. 3 is a partial side view of the roof member in the closed condition, and further including a linkage and part of a headliner retractor of the convertible system.
Figure 4:
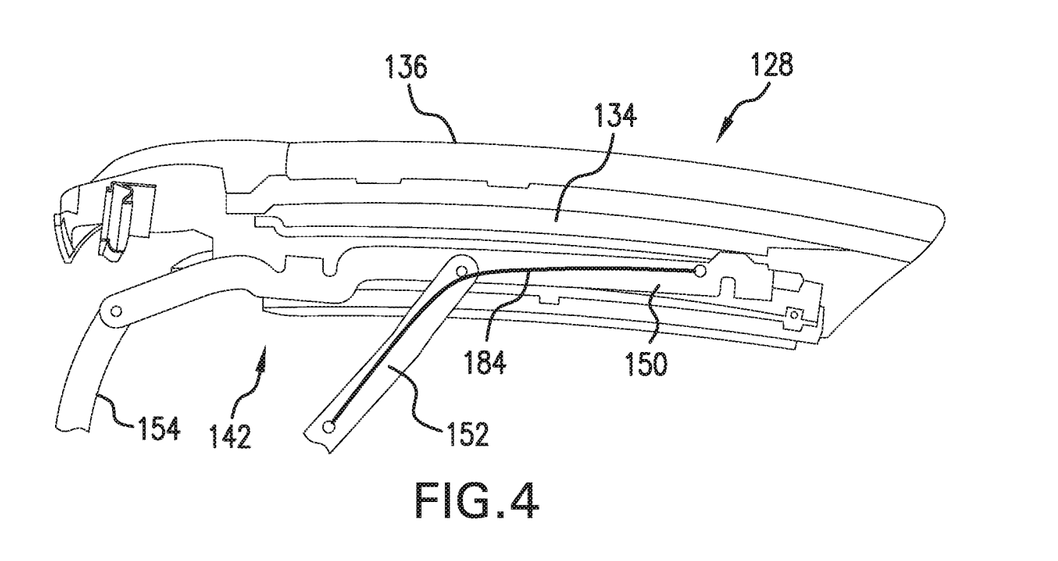
FIG. 4 is a partial side view of the roof member in FIG. 3 during movement to the stowed condition.

FIGS. 3 and 4 depict a linkage 142 operably connected along a side 144 of the roof member 128 which extends along the side rail 102 in the closed condition of the roof member. The linkage 142 is adapted to move the roof member 128 between the closed condition and the stowed condition. In the depicted aspect, the linkage 142 includes a static link 150 extending in the vehicle length direction and connected to the frame 134 of the roof member 128, a drive link 152 movably coupled to the static link 150, and a follower line 154 also movably coupled to the static link 150 rearward of the drive link. It should be appreciated that a similarly constructed linkage 156 is provided on the other side 146 of the roof member 128 along the side rail 104 (see FIGS. 11(a)-13(b)). As is well known, the linkages 142, 156 can be operably driven by drive mechanism including an electric motor. The electric motor can be operably controlled by a vehicle controller and a vehicle occupant accessible open/close switch located in the passenger compartment 130 of the vehicle 100.

Figure 5:
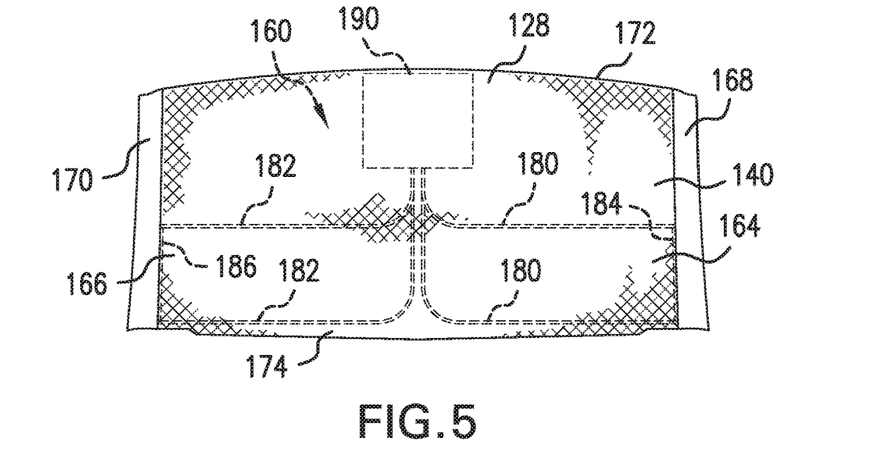
FIGS. 5-7 schematically depict the operation of the headliner retractor.
Figure 6:
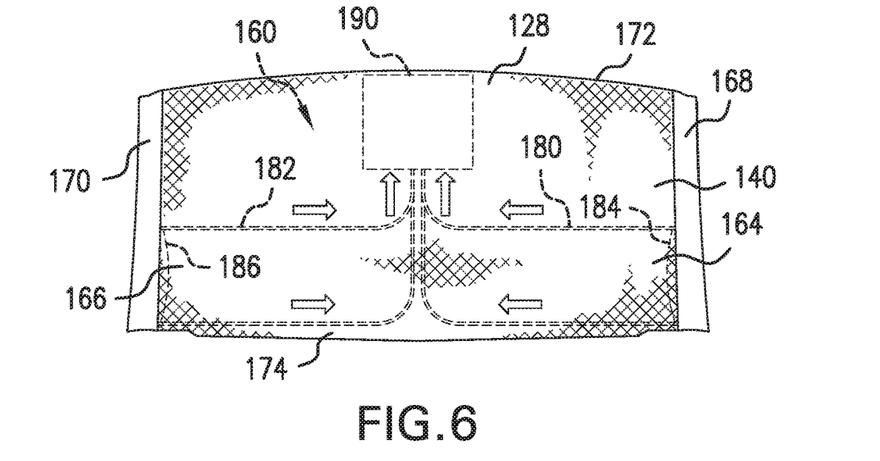
Figure 7:
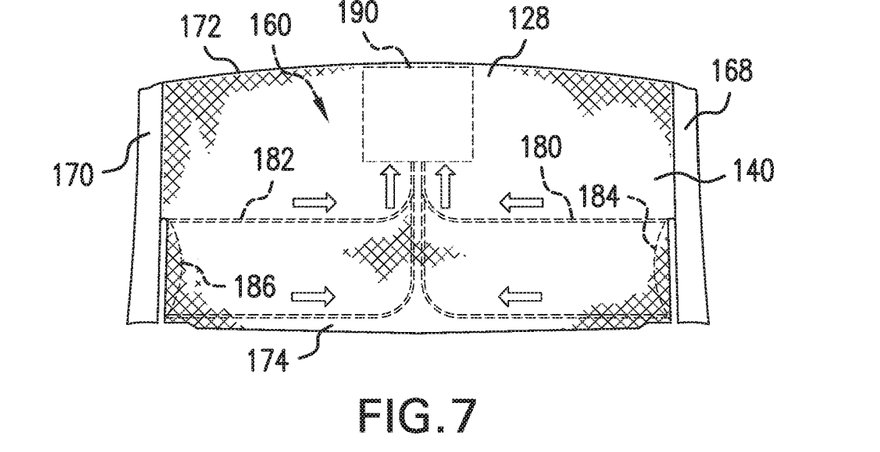

According to the present disclosure, a retractor 160 is attached to the roof member 128 and connected to lateral side portions 164, 166 of the headliner cover 140. As depicted in FIGS. 5-7, the lateral side portions 164, 166 of the headliner cover 140 are located along interior garnish moldings 168, 170, which aesthetically cover the respective the side rails 102, 104 when viewed from inside the passenger compartment 130 (see FIG. 2). The garnish moldings 168, 170 can be made of a polymeric material or other known fabric covered substrates. Further, in the exemplary aspect, the lateral side portions 164, 166 conceal a spacing between the headliner 138 and each of the side rails 102, 104 and garnish moldings 168, 170 (see FIG. 8) through which the linkages 142, 156 move during movement of the roof member 128. The lateral side portions 164, 166 are spaced rearward in the vehicle length direction from a forward edge portion 172 of the headliner cover 140 and can at least partially form a rear edge portion 174 of the headliner 138. The retractor 160 is operable by movement of the linkages 142 156, wherein the retractor 160 is adapted to move the lateral side portions 164, 166 of the headliner cover 140 between a covering position (FIG. 5) which conceals the linkages 142, 156 in the closed condition of the roof member 128 and a retracted position (FIG. 7) inwardly of the side rails to provide a swing clearance for the linkages 142, 156 as the roof member 128 is moved to the stowed position.

According to the present embodiment, the retractor 160 include first tensioning members 180, 182 and second tensioning members 184, 186. The first tensioning members 180, 182 extend in opposite directions in a vehicle width direction on the roof member 128 and are connected to the lateral side portions 164, 166 of the headliner cover 140. The first tensioning members 180, 182 are further connected to a tensioning mechanism 190 mounted to the frame of the roof member 128 and covered by the headliner cover 140. In the depicted aspect, the first tensioning members 180, 182 are flexible first cables that can be routed from the tensioning mechanism 190 to the lateral side portions 164, 166, for example, by pulleys secured to the roof member 128. The second tensioning members 184, 186 extend in the vehicle length direction on the roof member 128, and are connected to the respective linkages 142, 156 and the respective first tensioning members 180, 182. And in the covering position of the headliner cover 140, the second tensioning members 184, 186 are at least partially concealed by the lateral side portions 164, 166 of the headliner cover. In the depicted aspect, the second tensioning members 184, 186 are flexible second cables. Further depicted, the second tensioning member 184 is connected to the static and drive links 150, 152 of the linkage 142 (FIGS. 3 and 4), and the second tensioning member 186 is connected to static and drive links 194, 196 of the linkage 156 (FIG. 11(a)).

Figure 13A:
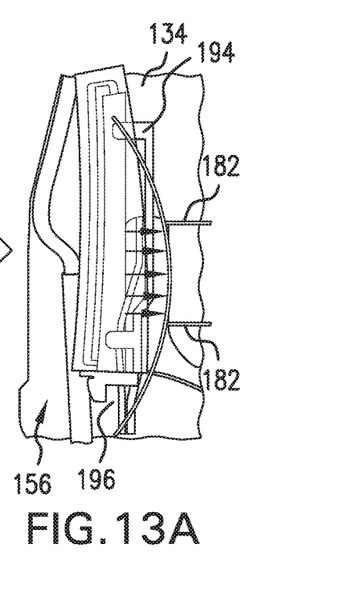
Figure 13B:
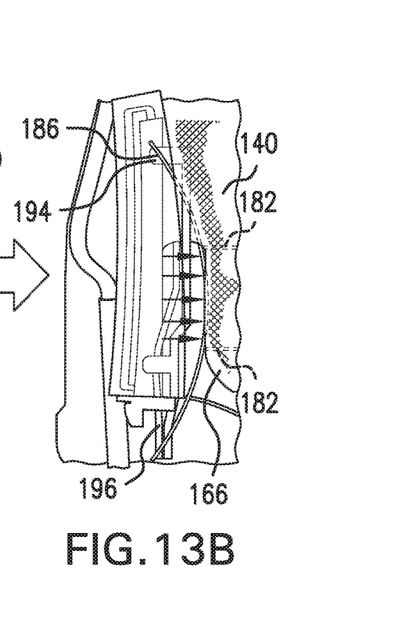

FIGS. 5, 8 and 11(a)-11(b) depict the roof member 128 in the closed condition wherein the first tensioning members 180, 182 are in a tensioned state due to the positioning of the static and drive links of the linkages 142, 156, the second tensioning members 184, 186 are in a tensioned state via the tensioning mechanism 190, and the lateral side portions 164, 166 of the headliner cover 140 are in the covering position. As the roof member 128 begins to move toward the stowed condition, the drive links 152, 196 pivot relative to the static links 150, 194, which, in turn, displaces the connections of the second tensioning members 184, 186 to the drive links 152, 196 toward the connections of the second tensioning members 184, 186 to the static links 150, 194. FIG. 4 illustrates the second tensioning members 184, 186 losing tension during movement of the roof member 128. It should be appreciated that because the first tensioning members 180, 182 remain in the tensioned state during the movement of the roof member 128 to the stowed condition (via the tensioning mechanism 190), the second tensioning members 184, 186 are at least partially pulled inwardly on the roof member 128 by the first tensioning members 180, 182 (see FIGS. 12(a)-12(b)). This inward movement displaces the lateral side portions 164, 166 of the headliner cover 140 toward the retracted position allowing the linkages 142, 156 to swing through the roof member 128 (see FIG. 9). FIGS. 10 and 13(a)-13(b) depict the stowed condition of the roof member 128. In the stowed condition, the first tensioning members 180, 182 remain in the tensioned state, the second tensioning members 184, 186 are in a relaxed state, and the lateral side portions 164, 166 of the headliner cover 140 are in the retracted position.

Accordingly, with the retractor 160, the lateral side portions 164, 166 of the headliner cover 140 can be pulled inwardly on the roof member 128 having a solid roof construction. The tensioning mechanism 190 pulls the first tensioning members 180, 182 connected to the lateral side portions 164, 166 of the headliner cover inboard at the same time the second tensioning members 184, 186 lose tension. This causes the lateral side portions 164, 166 of the headliner cover 140 to pull inboard and allow for the linkages 142, 156 to swing through the headliner 138. When transitioning the roof member 128 in the closing direction, the second tensioning members 184, 186 connected to the linkages 142, 156 are again tensioned and overcome the tension force in the first tensioning members 180, 182. This tensioning of the second tensioning members 184, 186 pulls the first tensioning members outboard on the roof member 128, and inturn, the lateral side portions 164, 166 of the headliner cover 140 to the covering position. The present convertible system allows the swing paths of the linkages 142, 156 to remain hidden, and in the closed condition of the roof member 128 this allows the headliner cover 140 to have a smooth appearance when viewed from within the passenger compartment without indicating the linkage swing path.

It should be appreciated that the tensioning mechanism 190 can include torsion springs or similar devices to maintain the tension on the first tensioning members 180, 182. The tensioning mechanism 190 can also include an electric motor which operably drives the first tensioning members 180, 182, the electric motor being operably controlled by the vehicle controller. Further, the first and second cables which define the first and second tensioning members can be sewn into the headliner cover 140.

It will be appreciated that the above-disclosed and other features and functions, or alternatives or varieties thereof, may be desirably combined into many other different systems or applications. Also that presently unforeseen or unanticipated alternatives, modifications, variations or improvements therein may be subsequently made by those skilled in the art which are also intended to be encompassed by the following claims.

The invention claimed is:

1. A convertible system for a vehicle comprising:
   left and right side rails extending in a vehicle length direction and at least partially defining a roof opening;
   a roof member covering the roof opening, the roof member including a frame, an outer cover attached to the frame and a headliner attached to an underside of the frame, the headliner including a headliner cover;
   a linkage operably connected to the roof member, the linkage adapted to move the roof member between a closed condition and a stowed condition; and
   a retractor attached to the roof member and connected to lateral side portions of the headliner cover, the retractor operable by movement of the linkage, wherein the retractor is adapted to move the lateral side portions of the headliner cover between a covering position which conceals the linkage in the closed condition of the roof member and a retracted position inwardly of the side rails to provide clearance for the linkage as the roof member is moved to the stowed position.

2. The convertible system of claim 1, wherein the retractor include left and right first tensioning members extending in opposite directions in a vehicle width direction on the roof member, the left and right first tensioning member connected to the lateral side portions of the headliner cover.

3. The convertible system of claim 2, wherein the retractor includes left and right second tensioning members extending in the vehicle length direction on the roof member, the left and right second tensioning members connected to the linkage and the respective left and right first tensioning members.

4. The convertible system of claim 3, wherein in the closed condition of the roof member, the left and right first tensioning members and the left and right second tensioning members are in a tensioned state.

5. The convertible system of claim 4, wherein in the stowed condition of the roof member, the left and right first tensioning members are in the tensioned state and the left and right second tensioning members are in a relaxed state.

6. The convertible system of claim 5, wherein during movement of the roof member to the stowed condition, the left and right second tensioning members are at least partially pulled inwardly on the roof member by the left and right first tensioning members.

7. The convertible system of claim 5, wherein the left and right second tensioning members are adapted to lose tension during movement of the roof member from the closed condition to the stowed condition.

8. The convertible system of claim 3, wherein the linkage includes left and right static links connected to the frame of the roof member and left and right drive links movably coupled to the left and right static links, the left second tensioning member connected to the left static and drive links, the right second tensioning member connected to the right static and drive links.

9. The convertible system of claim 3, wherein each first tensioning member is a first flexible cable and each second tensioning member is a second flexible cable.

10. The convertible of claim 1, wherein the lateral side portions of the headliner cover are spaced rearward in the vehicle length direction from a forward edge portion of the roof member.

11. The convertible of claim 10, wherein the lateral side portions of the headliner cover conceal a spacing between the headliner and the side rails in the closed condition of the roof member.

* * * * *